United States Patent [19]

Giambalvo

[11] 3,754,958

[45] Aug. 28, 1973

[54] AMMONIUM SALT TREATED SULFONATED PHTHALOCYANINES

[75] Inventor: Vito Albert Giambalvo, Middlesex, N.J.

[73] Assignee: American Cyanamid Company, Stamford, Conn.

[22] Filed: May 8, 1972

[21] Appl. No.: 250,892

[52] U.S. Cl. .......................... 106/308 N, 106/288 Q
[51] Int. Cl. ............................................ C08h 17/14
[58] Field of Search ................... 106/288 Q, 308 N; 260/314.5

[56] References Cited
UNITED STATES PATENTS

| | | | |
|---|---|---|---|
| 2,212,924 | 8/1940 | Muehlbauer | 260/314 |
| 2,799,594 | 7/1957 | Ehrich | 106/288 |

*Primary Examiner*—Delbert E. Gantz
*Assistant Examiner*—S. Berger
*Attorney*—Samuel Branch Walker

[57] ABSTRACT

A copper phthalocyanine pigment having improved body in a wide variety of vehicle formulations is prepared by treating a partially sulfonated copper phthalocyanine, which contains red and/or green shade unsulfonated copper phthalocyanine together with the sulfonated copper phthalocyanine, with a salt of a primary, secondary, or tertiary alkyl, cycloalkyl, aralkyl, cyclized alkyl or cycloalkyl amine or quaternary ammonium compound having a total of about four to about 18 carbon atoms attached to each nitrogen, in an aqueous medium at a temperature between about 20°C. and about 100°C., the pH of the treated pigment being between about 4 and about 7.

12 Claims, No Drawings

AMMONIUM SALT TREATED SULFONATED PHTHALOCYANINES

RELATED APPLICATIONS

An application Ser. No. 119,965, Mar. 1, 1971 Daniel Walter Thomas and Vito Albert Giambalvo, AMINE TREATMENT OF SULFONATED PHTHALOCYANINES, of common ownership, discloses treatment of phthalocyanine with free amines.

BRIEF SUMMARY OF THE INVENTION

Blue colored copper phthalocyanine pigments are an important class of commercial pigments used in many applications in paints, enamels, printing inks, etc. Certain requirements must be met to give good results in various vehicle systems. Certain copper phthalocyanine pigments, both green shade and red shade, are especially useful in printing ink formulations; however, there is a wide variation in commercial printing ink vehicle formulations. Desirably, the copper phthalocyanine pigment should retain its preferred characteristics regardless of the type of printing ink vehicle.

In many prior instances, those pigments which gave good results in one printing ink composition show definite deficiencies when used in other ink formulations, in, for example, strength of color, gloss, transparency, clarity, both by reflected and transmitted light, storage stability, flocculation and crystallization resistance, and convenience of use, such as ease of dispersibility, and body characteristics in ink and paint systems.

The present pigments have improvements in body and body stability, without loss of other characteristics or even improvements in color shade, transparency, and strength.

BACKGROUND OF THE INVENTION

U.S. Pat. No. 2,187,816, Hartmann and Moll, January 1940 shows the treatment of more highly sulfonated copper phthalocyanines with amines such as cyclohexylamine and dodecylamine.

U.S. Pat. No. 2,699,442, Eastes and Cooke, Jan. 1955 shows treating an unsulfonated copper phthalocyanine in the red shade form with octadecylamine or laurylamine.

U.S. Pat. No. 2,526,345, Giambalvo, Oct. 1950, shows a blend of 5 to 40 percent sulfonated copper phthalocyanine monosulfonic acid and from 95 to 60 percent unsulfonated copper phthalocyanine. This would be about 0.04 to 0.4 sulphonic acid groups per copper phthalocyanine molecule.

U.S. Pat. No. 2,315,870, Nadler, Wegler and Bayer, Apr. 1943 shows treating copper phthalocyanine sulphonic acid chloride with an alkylamine which is an isoalkylamine of about 15 carbon atoms.

The present invention is based on the discovery of a copper phthalocyanine pigment composition which is useful in a wide variety of ink formulations, with no loss or minimal loss in desirable properties, and having improved body characteristics.

The new pigment compositions are prepared by treating a partially sulfonated copper phthalocyanine with a salt of an alkyl, aralkyl, cyclized alkyl or cycloalkyl primary, secondary or tertiary amine or a quaternary ammonium salt, having about four to about 18 carbons attached to each nitrogen which salt may be used as such, or formed in situ, and which may in part be a salt with the sulfonic acid group on the copper phthalocyanine.

The copper phthalocyanine pigment composition resulting from the said treatment should be sulfonated to the extent that it contains from about 0.03 to about 0.18 sulfonic acid groups per phthalocyanine molecule. A range of 0.08 to 0.10 is generally preferable for best results. The treatment with nitrogenous salt is preferably carried out in an aqueous medium at a temperature between about 20°C. and 100°C. A preferred range is from about 75°–85°C. The treatment is accomplished within a pH range of about 4 to about 7. The nitrogenous salt should be water soluble.

In order to obtain the salt treated sulfonated phthalocyanine composition of the invention, a phthalocyanine having from 0.03 to 1.5 sulfonic acid groups per phthalocyanine molecule is treated. However, when the starting phthalocyanine has a sulfonic acid content of more than 0.18 sulfonic acid group per molecule, the treated phthaloycanine is blended with sufficient unsulfonated phthalocyanine to dilute to a final phthalocyanine composition having from 0.03 to 0.18 sulfonic acid groups per molecule. The more highly sulfonated copper phthalocyanine may be blended with unsulfonated copper phthalocyanine before, during or after nitrogenous salt treatment, or the components may be separately treated and blended later.

To obtain the sulfonated phthalocyanine for the amine salt treatment, the copper phthalocyanine may be directly sulfonated by known methods; for example, the reaction of the copper phthalocyanine with oleum in sulfuric acid. The sulfonation may be carried out to such an extent that the resultant phthalocyanine contains from about 0.03 to 1.5 sulfonic acid groups per phthalocyanine molecule. However, it is expedient, since better sulfonation control can be achieved, to sulfonate to about 0.25 to about 1.5 sulfonic acid groups per molecule. Conveniently, the copper phthalocyanine is sulfonated to an average sulfonic acid content from about 0.4 to 0.8 sulfonic acid groups per molecule by heating copper phthalocyanine with 100.5 percent sulfuric acid at about 92°C., until sulfonated to the desired degree, and the product is blended back during processing to the desired sulfonic content Direct sulfonation of phthalocyanine is not practical if a green shade phthalocyanine is desirable since the acid based procedure in the direct sulfonation results in the red shade form Conveniently, with either a red shade or a green shade phthalocyanine the more highly sulfonated product may then be blended with unsulfonated green shade or red shade phthalocyanine or a mixture thereof to give a copper phthalocyanine composition with the desired sulfonic acid content, and shade characteristics.

Sulfonation to a greater degree than desired in the final product, and then blending with unsulfonated phthalocyanine to give the composition with the desired sulfonic acid content is applicable for both the red shade and the green shade product. Sulfonation of the phthalocyanine to a higher degree of sulfonation followed by blending with unsulfonated product also allows more accurate control of the sulfonic acid content, and reduces the quantity that must be treated in the sulfonating step.

The sulfonated phthalocyanine used for the composition of the invention is conveniently obtained by the sulfonation process using oleum. HOwever, a sulfonated phthalocyanine resulting from the use of a sulfonated starting material used in the original synthesis of the phthalocyanine is also suitable. Thus, for example, in the preparation of copper phthalocyanine via the well known phthalic acid-urea method, a phthalic acid starting material containing sulfonic acid radicals when used in the synthesis will result in sulfonated phthalocyanines. The proportion of the sulfonic acid substituted starting material used will determine the extent of sulfonation in the final material.

In the practice of this invention, various ammonium salts give excellent results. As used herein the term nitrogenous compound is used to include free amines, amines as the free bases, amines as acid salts, with either the sulfonic group of the sulfonated phthalocyanine or other acidic groups, quaternary ammonium bases, and quaternary ammonium salts. Cyclized alkyl amines such as pyrrolidine or piperidine, which can be considered as dialkyl amines in which the alkyl groups are joined are included. A complete list would be unduly long, but representative and illustrative of such nitrogen compounds are:

Primary Amines butylamine (any isomer)
mixed butylamines
pentylamine (any isomer)
mixed pentylamines
hexylamine (any isomer)
mixed hexylamines
hexenylamine
heptylamine (any isomer)
mixed heptylamines
octylamine (any isomer)
mixed octylamines
decylamine (any isomer)
mixed decylamines
dodecylamine
tetradecylamine
hexadecylamine
octadecylamine
benzylamine
cyclohexylamine

Secondary Amines diethylamine
dipropylamine (any isomer)
mixed dipropylamines
dibutylamine (any isomer)
mixed dibutylamines
dipentylamine (any isomer)
mixed dipentylamines
dihexylamine (any isomer)
mixed dihexylamines
diheptylamine (any isomer
mixed diheptylamines
dioctylamine (any isomer)
mixed dioctylamines
dibenzylamine
piperidine
pyrrolidine
pyrrolidinone
methylbutylamine (any isomer)
methylpentylamine (any isomer)
methylhexylamine (any isomer)
methylheptylamine (any isomer)
methyloctylamine (any isomer)
methyldecylamine (any isomer)
methyldodecylamine
methyltetradecylamine
methylhexadecylamine
ethylbutylamine (any isomer)
ethylpentylamine (any isomer)
ethylhexylamine (any isomer)
ethylheptylamine (any isomer)
ethyloctylamine (any isomer)
ethyldecylamine (any isomer)
ethyldodecylamine
ethyltetradecylamine
ethylhexadecylamine
propylbutylamine (any isomer)
propylpentylamine (any isomer)
propylhexylamine (any isomer)
propylheptylamine (any isomer)
propyloctylamine (any isomer)
propyldecylamine (any isomer)
propyldodecylamine
propyltetradecylamine
butylpentylamine (ang isomer)
butylhexylamine (any isomer)
butylheptylamine (any isomer)
butyloctylamine (any isomer)
butyldecylamine (any isomer)
butyldodecylamine (any isomer)
butyltetradecylamine (any isomer)
pentylhexylamine (any isomer)
pentylheptylamine (any isomer)
pentyloctylamine (any isomer)
pentyldecylamine (any isomer)
pentyldodecylamine
hexylheptylamine (any isomer)
hexyloctylamine (any isomer)
hexyldecylamine (any isomer)
hexyldodecylamine
diallylamine
methylbenzylamine
ethylbenzylamine
propylbenzylamine (any isomer)
butylbenzylamine
pentylbenzylamine (any isomer)
hexylbenzylamine (any isomer)
heptylbenzylamine (any isomer)
octylbenzylamine (any isomer)

Tertiary Amines triethylamine
tripropylamine (any isomer)
tributylamine (any isomer)
tribenzylamine (any isomer)
trihexylamine (any isomer)
triallylamine
dimethylethylamine
dimethylpropylamine (any isomer)
dimethylallylamine (any isomer)
dimethylbutylamine (any isomer)
dimethylpentylamine (any isomer)
dimethylhexylamine (any isomer)
dimethylheptylamine (any isomer)
dimethylbenzylamine
dimethyloctylamine (any isomer)
dimethyldecylamine
dimethyldodecylamine
dimethyltetradecylamine
dimethylhexadecylamine diethylpropylamine (any isomer)
diethylallylamine
diethylbutylamine (any isomer)
diethylpentylamine (any isomer)
diethylhexylamine (any isomer)
diethylheptylamine (any isomer)
diethylbenzylamine
diethyloctylamine (any isomer)
diethyldecylamine
diethyldodecylamine
diethyltetradecylamine
dipropylethylamine (any isomer)
dipropylallylamine (any isomer)
dipropylbutylamine (any isomer)
dipropylpentylamine (any isomer)
dipropylhexylamine (any isomer)
dipropylheptylamine (any isomer)
dipropylbenzylamine (any isomer)
dipropyloctylamine (any isomer)
dipropyldecylamine (any isomer)
dipropyldodecylamine (any isomer)
dibutylethylamine (any isomer)
dibutylpropylamine (any isomer)
dibutylallylamine (any isomer)
dibutylpentylamine (any isomer)
dibutylhexylamine (any isomer)
dibutylheptylamine (any isomer)
dibutylbenzylamine (any isomer)
dibutyloctylamine (any isomer)
dibutyldecylamine (any isomer)
dibutyldodecylamine (any isomer)
methyldibenzylamine
ethyldibenzylamine
propyldibenzylamine (any isomer)
butyldibenzylamine (any isomer)

Any of the above amines as the free base, or as water soluble salts.

Quaternary Ammonium Salts trimethylhexyl ammonium salts
trimethylheptyl ammonium salts
trimethyloctylammonium salts
trimethyldecyl ammonium salts
trimethyldodecyl ammonium salts
trimethyltetradecyl ammonium salts
also the corresponding free bases.

Mixtures of these may be used and give good results. A preferred amine is tert-octylamine (1,1,3,3-tetramethylbutylamine). For the nitrogen compound treatment, from about 2 to 15 percent by weight based on the total final phthalocyanine content is suitable.

If in basic form the nitrogenous compound reacts in part with the sulfonic acid groups on the sulfonated phthalocyanine. As the pH is adjusted to between about 4 and about 7, free basic forms become salts. The amount of acid needed for pH adjustment varies with the proportion of free base in the nitrogenous compound, and the acid used for pH adjustments.

Typical acids which can be added to form the salts include:
formic acid
acetic acid
chloracetic acid
propionic acid
benzoic acid
p-toluic acid
salicylic acid
benzenesulfonic acid
p-toluenesulfonic acid
hydrochloric acid
hydrobromic acid
hydriodic acid
phosphoric acid
nitric acid
sulfuric acid Mixtures of acids such as these may be used if desired. Acetic acid is preferred, as it is economical and tends to form a buffer system that holds the pH in the desired range. Mineral acids such as hydrochloric require more care to control the pH and avoid local overacidification. Acetic acid even if added in excess, does not unduly lower the pH. Acetic acid is comparatively safe to handle.

Quaternary ammonium salts such as the Arquads (Armour Chemical), for example, Arquad 12, which is primarily dodecyltrimethylammonium chloride, are commercially available in quantity and economically.

Theoretically one amine or substituted ammonium molecule reacts with each sulfonic acid group. In pigmentary form some sulfonic groups may not be available for reaction because they are deep inside a solid particle, and some amine or substituted ammonium compound may be physically absorbed on the pigment particles. If unsulfonated phthalocyanine is given such treatment, a certain amount of the salt is retained, a typical retention being approximately 0.3 to 0.4 percent amine, depending on the degree of washing.

The amount of water used in this process is not critical but preferably enough is used to result in a stirrable fluid mass; this usually requires at least 5 parts of water per part of the phthalocyanine; at least about 8–9 parts is preferred. Greater proportions of water may be used, but this requires larger tanks, etc. The temperature used for the nitrogenous compound treatment ranges from about 20° to about 100°C. A temperature of about 75° to 85°C. is preferred. At this latter temperature the treatment is effectively completed in from about 1 to 2 hours, but the batch may be stored for a longer time, for instance overnight or over a weekend if convenient for production schedules.

It is an advantage of this invention that most excess nitrogenous salt is separated readily from the product pigment during the workup in the process. Because the nitrogenous salts usually are water soluble, most excess is removed in the aqueous phase during filtration and washing stages.

The salts of the nitrogenous compounds should be sufficiently soluble so that any excess may be readily washed out with water. The more soluable salts require less washing. The acetates are generally quite soluble, economical, readily available, non-toxic, odor free and easily processed. other salts may be used where available.

If the pigment is treated with free amine instead of amine salt, the excess amine must be removed by time-consuming techniques which involve evaporation and distillation or steam distillation, which are accompanied by related problems such as amine odors, frothing, processing costs etc.

The presence of a large excess of salt such as the sulfate or acetate in the product should be avoided since this may affect the working properties of the solvent ink system in which the product is used. For instance, an excess nitrogenous salt can result in a higher viscosity in some rotogravure inks, which may not be desired by the printer.

For the nitrogenous salt treatment, unsulfonated phthalocyanine may be blended in the form of a presscake with a sulfonated phthalocyanine presscake made just alkaline with NaOH followed by addition of the nitrogenous compound and enough acid to lower the pH to within a range of about 4–7 (referred to as in situ method) to form the salt. Alternatively the two pigments in dry form may first be dry blended and then added to an aqueous system containing the amine salt.

Alternatively also, the unsulfonated phthalocyanine and the sulfonated phthalocyanine either in dry powder or presscake form may separately be given the nitrogenous salt treatment, the treated products blended to result in a product with the desired sulfonic acid content, either as a presscake or in dry form. Either one of the components may be in dry powder form and blended with the other in presscake form.

Although preferred, it is not necessary to subject both the sulfonated and unsulfonated copper phthalocyanine products used for blending to the nitrogenous salt treatment. Substantial improvement results if at least the sulfonated phthalocyanine which is blended is given the nitrogenous salt treatment. Thus, for dry blending operations, the sulfonated phthalocyanine may be nitrogenous salt treated and the dried product blended with unsulfonated phthalocyanine which has not undergone treatment.

Obviously the particles of the final product must be of pigmentary size to function as a pigment. Normally, phthalocyanines useful as pigments have a particle size of less than about 0.5 microns. Usually, but not necessarily, the copper phthalocyanine is reduced to pigmentary size before the nitrogenous salt treatment. It can be treated first, and then ground or milled to pigmentary size, but size reduction is usually more conveniently accomplished before the nitrogenous salt treatment.

Similarly, lower and higher sulfonated copper phthalocyanine pigments may be blended and nitrogenous salt treated in any order, but for economic considerations procedures using fewer components and less handling are preferred.

The nitrogenous salt treated products are especially useful in various types of solvent ink systems such as rotogravure or flexographic inks. Thus, evaluation in the various types of ink systems show that the products of this invention give good results; generally the good results are not limited to only certain ink systems. Examples of standard ink compositions include those known as Rotogravure type C vehicle and Cosolvent Polyamide Flexographic ink.

The products of this invention show superior characteristics over a more highly sulfonated phthalocyanine product which has been given an analogous amine treatment. Thus the improvement in the properties in the various ink systems with respect to greater strength, gloss, transparency, clarity and bodying is unique to the composition of this invention within the proportions here described.

The invention is further illustrated by the following examples in which parts are by weight, unless otherwise clearly set forth.

EXAMPLE 1

Sulfonation of Copper Phthalocyanine

To 1,410 parts of 100.5% $H_2SO_4$ is added at 25°C., 100 parts of copper phthalocyanine, and the mixture is slowly heated to 88°–90°C. and held there 1.5 hours. The thus formed solution is cooled to 40°C. and 200 parts of xylene are added. After 0.5 hour at 55°C., the solution is poured into 14,000 parts of water, forming a slurry which is heated to 70°–75°C. and filtered. The product is washed essentially sulfuric acid free with water, resulting in 952 parts of presscake which contains 106 parts of a solid product having an average composition of $CuPc(SO_3H)$ 0.67. (0.67 mol sulfonic acid group per mol of CuPc).

EXAMPLE 2

In Situ Amine Salt Treatment

A mixture of 360 parts of sulfonated phthalocyanine presscake from Example 1 (40 parts solids), 1,000 parts of green shade copper phthalocyanine presscake (260 parts solids), and 1,500 parts of water is vigorously agitated until the solids are well dispersed. The slurry is made just alkaline (8–9 pH) with dilute sodium hydroxide solution, stirred for 15 minutes and 22 parts of tert-octylamine added, and the pH adjusted to pH 5 with about 12 grams of glacial acetic acid. The resulting mixture is heated to 80°C. for 2 hours with stirring. The product is filtered, washed and dried, to give 300 parts of phthalocyanine pigment. The pigment is crushed in a mill such as a fixed or swinging hammer mill.

The product here has an average of 0.09 sulfonic acid groups per phthalocyanine molecule.

This procedure is also applicable for use with red shade phthalocyanine instead of green shade product. An excellent red shade phthalocyanine pigment is thus obtained.

Tert-octylamine gives excellent results, and is commercially available economically.

EXAMPLE 3

In Situ Free Amine Treatment

Example 2 is repeated, but without addition of both sodium hydroxide and acetic acid. (no pH control). After the mixture is heated to 80° for 2 hours, the excess tert-octylamine is removed by steam distillation and the product isolated by filtering hot and drying at 90°. Analysis indicates an average of 0.09 sulfonic acid group per phthalocyanine molecule.

The objectionable odor of free amine as well as the extra time consuming step of steam stripping of the excess of unreacted amine which may be complicated by foaming in this Example 3 are absent in Example 2. The utilization of amine salt gives freedom from odor, and saves the cost of stripping.

EXAMPLE 4

In Situ Treatment with Dodecyltrimethylammonium Chloride

A mixture of 360 parts of sulfonated phthalocyanine presscake from Example 1 (40 parts solids), 1,000 parts green shade copper phthalocyanine presscake (260 parts solids), and 1,500 parts of water is vigorously agitated until all solids are well dispersed. The slurry is made just alkaline with dilute sodium hydroxide solution, stirred 15 minutes and 24 grams of dodecyltrimethylammonium chloride, 50 percent solids (Arquad 12) added and the pH adjusted to 7. The resulting mixture is heated at 80° for 1 hour, and the product is collected by filtration. An excellent pigment is obtained.

EXAMPLE 5

Amine Salt vs. Free Amine

The product of Example 2 (treatment with amine acetate) is compared against the product of Example 3 (treatment with free amine) with respect to pigmentary behavior in rotogravure type C ink, cosolvent polyamide flexographic type ink, cosolvent polyamide ink and nitrocotton high viscosity ink. In all cases the studies of body characteristics, including body stability of the ink formulations, are conducted from the viscosity measurements made with a Brookfield Synchro-Lectric Viscometer A. Comparison of Pigment Properties in Rotogravure Type C Ink The pigmentary properties of the products of Examples 2 and 3 in rotogravure type C ink are determined by a procedure as follows.

The required composite vehicle is prepared by milling the following:
- 4.5 g. dibutyl phthalate
- 22.7 g. ¼" SS nitrocotton (70% real, ethyl alcohol
- 22.7 g. ethyl acetate
- 79.7 g. ethyl alcohol
- 6.7 g. isopropyl alcohol until a complete solution is formed. Ink formulations are prepared by milling 28.6 g. pigment, 136.3 g. composite vehicle, and 1,000 g. ¼ inch steel balls in a 16 oz. jar sealed with plastic film for 16 hours. The jar is opened, 13,6 g. of ethyl alcohol added, the jar resealed and milled again for 24 hours.

The jar is again opened, 30.8 g. ethyl alcohol and 20.0 g. ethyl cellosolve added, and the sealed container again milled for 30 minutes and the contents discharged.

Displays are prepared with this masstone ink using a No. 6 laboratory coating rod on paper-backed aluminum foil and on clear cellulose acetate film subsequently placed over a card with partial black background for transparency and gloss evaluations.

A type C white tint base composite for making tinting strength and tint tone evaluations is prepared as follows.

Into a 0.42 gal. porcelain mill are charged:
- 315.0 g. Type C vehicle as prepared above
- 472.0 g. TiO$_2$ (Unitane OR-580)
- 1,500.0 g. ½" dense ceramic balls This is ground 16–18 hours. Then there are added:
- 305.2 g. Type C vehicle
- 305.2 g. Type C vehicle
- 87.8 g. ethyl cellosolve The mixture is tumbled an additional hour and discharged.

The tinting ink for evaluation is prepared by using 124 parts Type C white tinting base above and 4.0 parts of phthalocyanine blue rotogravure type C ink to yield a tint ratio of 1:99; this is placed upon a Red Devil shaker for 15 minutes and prepared as drawdowns with No. 8 laboratory coating rod on paper backed aluminum foil. Observations in comparison as to strength, gloss, shade, etc. are shown in Table I below.

TABLE I

Comparison of Properties in Rotogravure Type C Ink

| Pigmentary Properties | Product of Ex. 3 (Treatment with Free Amine) | Product of Ex. 2 (Treatment with Amine Salt) |
|---|---|---|
| Cellulose Acetate Film | taken as standard for test procedures | |
| Reflected Light | | slightly more |
| Transmitted Light | | slightly more |
| Gloss | | slightly higher |
| Aluminum Foil Transparency | | slightly more |
| Strength | | equal |
| Body + (0 Day Viscosity) | 140 cps. | 63 cps. |
| Body Stability ++ (% Increase in Viscosity) | 280% | 50% |

+ fresh ink
++ 7 day old ink

The results in Table I illustrate the improvement in color values, body and body stability of the amine salt-treated product over the free amine-treated product with respect to the pigmentary properties in rotogravure type C ink.

B. Comparison of Pigmentary Properties in Cosolvent Polyamide Flexographic Ink (Formulation A)

The pigmentary properties of the products of Examples 2 and 3 are evaluated in cosolvent polyamide flexographic type ink by the following procedure.

The pigments are made up in a standard type cosolvent polyamide vehicle of the following composition:
- 600 g. polyamide resin (General Mills Versamid 940)
- 660 g. isopropyl alcohol
- 440 g. mineral spirits (Skellysolve B, essentially hexane BP 152°–156°F.)

The composite is rolled in a ½ gallon jar for several hours until a solution forms.

Ink formulations are then prepared by milling 15 g. pigment, 85 g. composite vehicle and 500 g. ⅛ inch steel balls for 24 hours (at 120 RPM) in an 8 oz. jar. The resulting inks are displayed using a No. 5 or 6 laboratory coating rod (a wire wound rod) on paper backed aluminum foil and on cellulose acetate film subsequently mounted on a card with a partial black background for transparency and gloss evaluations.

For tinting evaluations, compositions are prepared using TiO$_2$ (Unitane OR-580).

100 g. composite vehicle as above, containing 100 g. TiO$_2$ is rolled with berylite ceramic balls 18 to 20 hours in a pint size mill and 15 g. of this white is weighed with 1 g. blue base ink above into a 2 oz. bottle, and then shaken 15 min. on a paint shaker. The resulting tint is drawn down on aluminum foil with a No. 8 round laboratory coating rod. Observations in comparison as to strength, gloss, shade, body, body stability, etc. are shown in Table II.

TABLE II

Comparison of Properties in Cosolvent Polyamide Flexographic Ink (Formulation A)

| Pigmentary Properties | Product of Ex. 3 treatment with free amine | Product of Ex. 2 treatment with amine salt) |
|---|---|---|
| Cellulose Acetate Film | Taken as standard for test procedures | |
| Reflected light | | about equal |
| Transmitted light | | about equal |

| | | |
|---|---|---|
| Gloss | | about equal |
| Aluminum Foil | | |
| Transparency | | about equal |
| Strength | | about equal |
| Body + (0 day Viscosity) | 165 cps. | 152 cps. |
| Body Stability ++ (% Increase in Viscosity) | 140% | 70% |

+ fresh ink
++ 14 day old ink

The results of Table II illustrate the improvement in body stability of the amine salt-treated product over the free amine-treated product when used in cosolvent polyamide flexographic type ink.

C. Comparison of Pigmentary Properties in Cosolvent Polyamide Ink (Formulation B)

The pigmentary properties of the products of Examples 2 and 3 are evaluated in cosolvent polyamide inks by the following procedure.

To a vehicle composed of 5 grams of polyamide resin (General Mills Versamid 930), 10 grams high flash VM&P naphtha, (Super Naphtholite BP 245°–290°F.) and 25 grams anhydrous isopropanol are added 17 grams pigment and 500 g. ¼ inch steel balls and this milled for 20 hours. To this is then added a further vehicle composed of 15 g. of polyamide resin (Versamid 930), 11 g. of high flash VM&P naphtha, and 17 g. anhydrous isopropanol and milling continued an additional 30 minutes and the ink then discharged. The ink is then reduced in viscosity to a viscosity value of 25 seconds in a No. 2 Zahn cup. To accomplish this, there is added an appropriate amount of a solvent composed 2 parts VM&P naphtha and one part of isopropyl alcohol. The resulting inks are displayed on paper backed aluminum foil and on clear cellulose acetate and polyethylene films subsequently mounted on cards with partial black background for transparency and gloss evaluations. Observations in comparison as to reflected and transmitted light, gloss and transparency, body and body stability are shown in Table III.

TABLE III

Comparison of Properties in Cosolvent Polyamide Ink (Formulation B)

| Pigmentary Properties | Product of ex. 3 (treatment with free amine) | Product of ex. 2 (treatment with amine salt) |
|---|---|---|
| Cellulose Acetate Film | Taken as standard for test procedures | |
| reflected light | | Trace to slightly more |
| transmitted light | | Slightly more |
| gloss | | Trace to slightly higher |
| Polyethylene film | | |
| Reflected light | | Trace to slightly more |
| Transmitted light | | Slightly more |
| Gloss | | Trace to slightly more |
| Aluminum Foil | | |
| Transparency | | Slightly more |
| Body + (0 day Viscosity) | 143 cps. | 85 cps. |
| Body stability ++ (% increase in viscosity) | 57% | 34% |

+ fresh ink
++ 14 day old ink

D. Comparison of Pigmentary Properties in Nitrocotton High Viscosity Ink

The pigmentary properties of the two products are evaluated in high viscosity nitrocotton ink by the following procedure:

To 105 g. of commercial nitrocotton vehicle in a one pint jar are added 30 g. pigment and 1,000 g. ¼ inch steel balls and this milled 18 hours. An additional 15 g. vehicle is then added, milling continued one hour and the ink then discharged. The resulting ink is displayed in the form of drawdown masstones on clear cellulose acetate film, paper backed aluminum foil and bond paper. Observations in comparison as to reflected and transmitted light, gloss, etc. are shown in Table IV below.

TABLE IV

Comparison of Properties in Nitrocotton High Viscosity Ink

| Pigmentary properties | product of ex. 3 (treatment with free amine) | Product of ex. 4 (treatment with amine salt) |
|---|---|---|
| Cellulose Acetate Film | taken as standard for test procedures | |
| reflected light | | slightly more |
| transmitted light | | slight to moderately more |
| Gloss | | slightly more |
| aluminum foil | | |
| transparency | | moderately more |
| bond paper | | |
| print tone | | slightly more intense |
| undertone | | moderately more intense |
| finish | | about equal |
| Body + (0 day viscosity) | 2532 cps. | 1300 cps. |
| Body Stability ++ (% increase in viscosity) | 20% | 0% |

+ fresh ink ++ 14 day old ink

The results in Table IV illustrate the improvement in properties in the amine salt-treated product over the product treated with free amine when tested in a commercial nitrocotton ink.

Thus in A, B, C and D is shows the all-around superiority of the phthalocyanine product obtained by treatment with amine salt over that obtained by treatment with free amine when tested in various types of solvent ink systems.

EXAMPLE 6

Effect of pH on Amine-Salt Treatment

A mixture of 360 parts of sulfonated phthalocyanine presscake of Example 1 (40 parts solids), 1,000 parts of green shade unsulfonated copper phthalocyanine presscake (260 parts solids), and 1,500 parts of water is vigorously stirred until all solids are well dispersed. The slurry is made just alkaline (pH 8–9) with dilute sodium hydroxide solution and stirring continued for 15 minutes. To this is then added a solution of 22 g. tert-octylamine and 12 g. glacial acetic acid in 100 ml. of water. The resultant reaction mass (pH now 5.4) is divided into three equal portions, labeled A, B and C. The pH of B is adjusted to 6.7 with dilute sodium hydroxide solution and the pH of C similarly to 8.9. Strong odor of tert-octylamine is immediately evident in C and the free space shows an alkaline reaction to phenolphthalein paper. It is evident that at the high pH of C, at least partial conversion of the acetate salt to the free amine occurs.

After 2 hours at 80°, A, B, and C are each collected, dried and ground in a Hoover Muller and the color values of the drawdowns compared to those of a drawdown of product of Example 3.

The results are given in Table V.

TABLE V

Effect of pH of Amine Salt Treatment on Color Values of Product

| Color Value of Product | Product of Ex. 3 (treatment with free amine) | A(product of salt treatment)of pH 5.4) | B(product of salt treatment at pH 6.7) | C(product of amine salt treatment at pH 8.9) |
|---|---|---|---|---|
| masstone | Taken as standard for test procedures | trace to slightly darker | equal | equal |
| print tone | | trace more intense | equal | trace to slightly cleaner |
| undertone | | trace more intense | equal | trace to slightly redder |
| transparency | | equal | equal | equal |
| tint | | trace to slightly greener | trace to slightly cleaner | slightly cleaner |
| strength | 100% | 100% | 100% | 100% |

The results in Table V illustrate that variation of the pH in the amine salt treatment has but a minor effect on the color values of the resultant pigment.

The pigmentary properties of A, B, and C are evaluated in rotogravure type C ink by a procedure like that of Example 5, part A, in which the white tint base composite and composite vehicle are prepared and the drawdowns evaluated as to strength, gloss, body, body stability, etc. The results summarized in Table VI.

TABLE VII

Utility of Various Amine Salts in Treatment Procedure of Invention

| Example | Amine salt of pigment | Product of Ex. 3 | Pigmentary Properties Body | Body stability |
|---|---|---|---|---|
| 7 | dodecylamine salt | Taken as standard for comparison | much improved | improved |
| 8 | tert-octylamine sulfate | | considerably | much improved |
| 9 | 1:1 mixture of octylamine acetate and dodecylamine acetate | | considerably improved | improved |
| 10 | 1:1 mixture of octylamine sulfate and dodecylamine sulfate | | considerably improved | improved |
| 11 | dodecyltrimethylammonium chloride | | moderately improved | improved |
| 3 | tert-octylamine acetate | | considerably improved | much improved |

TABLE VI.—EFFECT OF pH OF AMINE SALT TREATMENT ON PIGMENTARY PROPERTIES OF PRODUCT IN ROTOGRAVURE TYPE C INK

| Color values | Product of Example 3 | A (product of amine salt treatment at pH 5.4) | B (product of amine salt treatment at pH 6.7) | C (product of amine salt treatment at pH 8.9) |
|---|---|---|---|---|
| Cellulose acetate film | Taken as standard | | | |
| Reflected light | For test procedures | Slightly less | Slightly less | Slightly less. |
| Transmitted light | | Trace to slightly less | do | Do. |
| Gloss | | Slight to moderately lower | Slight to moderately lower | Slightly lower. |
| Aluminum Foil | | | | |
| Transparency | | Equal | Slightly less | Equal. |
| Strength | | Moderately weaker | Equal | Slight to moderately stronger. |
| Body + (0 day viscosity) | 104 cps | 80 cps | 80 cps | 70 cps. |
| Body Stability ++ | 244% | 9% | 12% | 32%. |

NOTE: Percent increase in viscosity; + Fresh ink; ++ 7 day old ink.

The results in Table VI illustrate that while variation in the pH of the amine salt treatment has but a minor effect on the color values and body of the pigment when utilized in this rotogravure ink, the effect on the *body stability* of the ink is considerable; the treatment at pH 8.9 results in a product with less satisfactory body stability; thus the body of the rotogravure ink increases considerably more than in the cases in which the pH is maintained at a value of about 7 or lower.

EXAMPLES 7–11

The procedure of Example 2 is applicable if an equivalent amount of another suitable amine is used in place of tert-octylamine or if an equivalent amount of another suitable acid is used in place of the acetic acid. In Table VII is presented data on pigmentary properties identified with body and body stability in various ink formulations containing the various nitrogenous salts of the phthalocyanine compositions which can be considered typical of those that can be used in this invention. The standard for comparison is the reaction product of Example 3.

The results in Table VII illustrate the utility of the various amine salt-treated phthalocyanine pigment compositions of this invention. In the various ink formulations investigated, the products of the invention show great improvement in body and body stability when compared to the corresponding product obtained by treating the pigment with free amines instead of amine salts.

With other vehicles and other test conditions, the exact results may vary widely, but comparatively, the nitrogenous salts of this invention give superior body characteristics, and are excellent pigments for a wide variety of ink, paint and resin formulations.

Similarly other amines, amine salts, quaternaries, and mixtures of the compounds listed in the table above give improved characteristics to pigments. The procedure of Example 2 can be followed, with adjustment of the quantity of acetic acid, or the substitution of the other acids above listed to maintain the pH within the range of about 4 to about 7.

The pH of the pigment product is conveniently measured by weighing 50 grams of the dry pigment into a 1,000 mol beaker with 250 ml. of distilled water. (adjust the pH of the water to 6.2 if necessary with N/10

NaOH or N/10 H₂SO₄ before use). The mixture is stirred with a high speed blender until the pigment is wet, allowed to stand overnight, and filtered. The pH of the filtrate at 25°C. is measured as the pH of the pigment.

Additional data on testing procedures and ink characteristics is set forth in Ser. No. 119,965, supra, and is incorporated herein by this reference.

I claim:

1. Process for the preparation of copper phthalocyanine pigment sulfonated to the extent of about 0.03 to about 0.18 sulfonic acid groups per copper phthalocyanine molecule which comprises treating a copper phthalocyanine having from about 0.03 to about 1.5 sulfonic acid groups per phthalocyanine molecule with a nitrogenous compound selected from the group consisting of quaternary ammonium bases, alkyl, aralkyl, cyclized alkyl, or cycloalkyl amines, and water soluble acid salts thereof and mixtures thereof having a total of about four to 18 carbons attached to each nitrogen in an aqueous medium at a pH between about 4 and about 7 at a temperature between about 20°C. and about 100°C., and if the nitrogenous compound treated phthalocyanine has a sulfonic acid content of more than about 0.18 sulfonic acid groups per phthalocyanine molecule, blending the thus treated phthalocyanine with sufficient unsulfonated phthalocyanine to give a phthalocyanine composition having about 0.03 to about 0.18 sulfonic acid group per phthalocyanine molecule.

2. The process of claim 1 where the unsulfonated copper phthalocyanine which is blended has been treated with a nitrogenous compound in an aqueous medium of pH between about 4 and about 7 at a temperature of about 20°C. to about 100°C.

3. The process of claim 1 which comprises: treating a partially sulfonated copper phthalocyanine containing from 0.03 to 0.18 sulfonic acid groups per phthalocyanine molecule, with said nitrogenous compound.

4. The process of claim 1 in which the sulfonated copper phthalocyanine being treated with said nitrogenous compound is prepared by blending unsulfonated copper phthalocyanine with a sulfonated copper phthalocyanine to give a mixture having 0.03 to 0.18 sulfonic acid groups per molecule of copper phthalocyanine.

5. The process of claim 1 wherein 2 to 15 percent of said nitrogenous compound based on the weight of copper phthalocyanine pigment in the final product is used.

6. The process of claim 1 in which said nitrogenous compound is 1,1,3,3-tetramethylbutyl ammonium acetate.

7. The process of claim 4 in which at least part of the copper phthalocyanine is green shade copper phthalocyanine blended with a sulfonated copper phthalocyanine.

8. The process of claim 4 in which red shade copper phthalocyanine is blended with sulfonated cooper phthalocyanine.

9. The process of claim 4 in which the blending is carried out between dry, partially sulfonated copper phthalocyanine and dry unsulfonated copper phthalocyanine to give a partially sulfonated mixture prior to the nitrogenous compound treatment in the aqueous medium.

10. The process of claim 4 in which the blending is carried out in the aqueous medium prior to adding the nitrogenous compound in the same aqueous medium.

11. A readily dispersible copper phthalocyanine pigment consisting essentially of copper phthalocyanine sulfonated to between about 0.03 and about 0.18 sulfonic acid groups per copper phthalocyanine molecule, in pigmentary form and on the surface thereof, a salt of a nitrogenous compound having a total of about four to about 18 carbon atoms total, and which pigment when suspended in water has a pH of between about 4 and about 7.

12. The pigment of claim 11 in which the total nitrogenous compound present is from about 0.35 to 8 percent by weight.

* * * * *

UNITED STATES PATENT OFFICE
CERTIFICATE OF CORRECTION

Patent No. 3,754,958   Dated August 28, 1973

Inventor(s) VITO ALBERT GIAMBALVO

It is certified that error appears in the above-identified patent and that said Letters Patent are hereby corrected as shown below:

Col. 2, l. 68, insert -- Ho -- for "HO".

Col. 4, l. 22, insert -- any -- for "ang".

Col. 6, l. 26, insert -- adsorbed -- for "absorbed".

Col. 9, l. 28, after "alcohol" insert -- wet) --.

Col. 9, l. 56, delete "305.2 g. Type C vehicle".

Col. 12, l. 21, insert -- slightly higher -- for "slightly more".

Col. 12, l. 37, insert -- shown -- for "shows".

Col. 14, l. 67, delete "mol" and insert -- ml. -- therefor.

Signed and sealed this 12th day of February 1974.

(SEAL)
Attest:

EDWARD M. FLETCHER, JR.
Attesting Officer

C. MARSHALL DANN
Commissioner of Patents